Jan. 5, 1943.  E. J. KREH, JR  2,307,516
COMMUTATOR-CENTERING MEANS
Filed Dec. 17, 1941
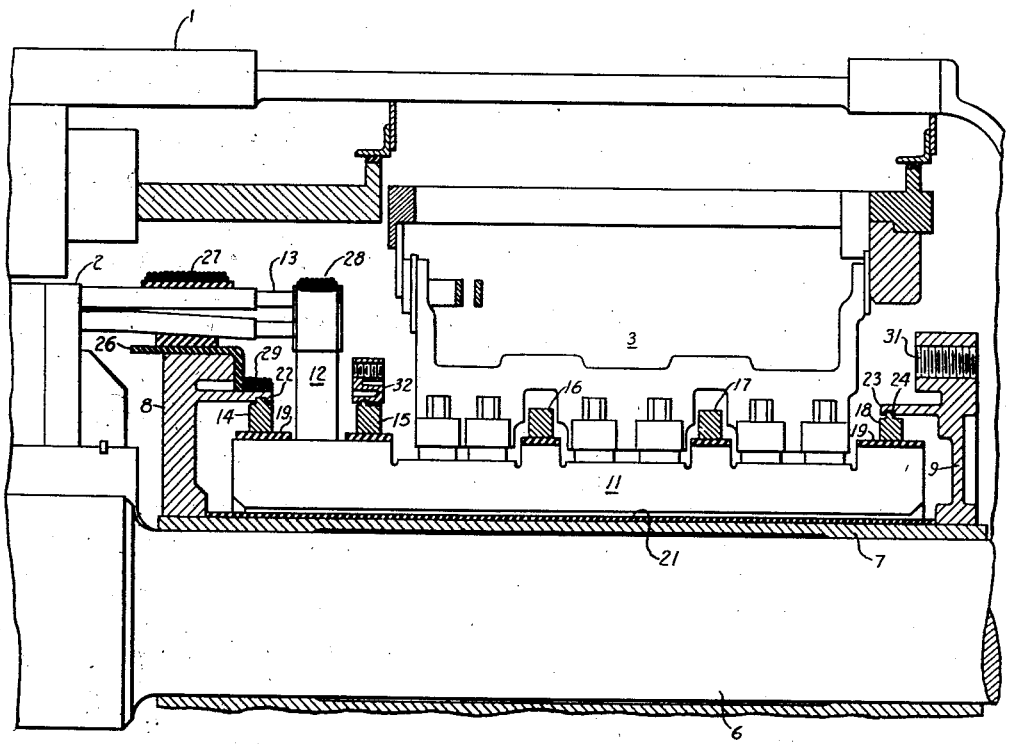
WITNESSES:
INVENTOR
Edward J. Kreh, Jr.
BY
ATTORNEY Patented Jan. 5, 1943

2,307,516

UNITED STATES PATENT OFFICE 2,307,516

COMMUTATOR-CENTERING MEANS

Edward J. Kreh, Jr., Murrysville, Pa., assignor to Westinghouse Electric & Manufacturing Company, East Pittsburgh, Pa., a corporation of Pennsylvania Application December 17, 1941, Serial No. 423,373

12 Claims. (Cl. 171—321)

My invention relates to high-speed dynamo-electric machines of the commutator type, and it has particular relation to a novel means for positively centering the rear end of a shrink-ring type of turbo-exciter commutator.

In the best previous design of commutator, for the application in question, the front end of the commutator was centered by means of a centering plate having overhanging cylindrical shoulder-means for engaging the outer periphery of the front-end shrink-ring surrounding the commutator-member, as shown in the Penney Patent 2,000,715, granted May 7, 1935, but the rear end of the commutator was not thus centered, because of the presence of the commutator-necks and the connections from the necks to the armature-windings, so that the rear end of the commutator was centered only by being drawn down against an insulating sleeve surrounding the shaft, by means of a rear-end shrink-ring surrounding the commutator segments, in front of the necks. Since the rear end of the commutator was drawn down against the insulated surface of the shaft, it was centered by means of the shaft, or the layer of insulation surrounding the shaft, so that the effects of high speeds and high temperatures would both work toward loosening the tight connection between the inner periphery of the rear end of the commutator and the insulated surface of the shaft.

In high-speed dynamo-electric machines of the type in question, one of the manufacturing problems consists in the necessity for very accurate balancing of all parts of the machine, particularly including the commutator; and in order to successfully balance the commutator-part of the machine, it is obviously essential that the commutator shall be very accurately centered with respect to the center-line of the shaft, as the slightest eccentricity will result in a serious unbalanced condition. As a result of recently developed, more accurate methods of balancing, and of determining the stability of previous commutator mountings, the need has been felt for a more accurate centering of the rear end of the commutator; but the presence of the commutator necks which are present at the rear end, and the armature winding connections to the tops of the necks, have stood in the way of the development of an improved rear-end centering-means.

The object of my invention is to solve the above-mentioned difficulties, and to provide a commutator in which the necks are connected to the segments at a point removed from the rear end thereof, and an additional rear-end shrink-ring is provided around these rear ends of the commutator segments, said additional shrink-ring being centered by a rear-end centering-plate which may be utilized also as a supporting-shoulder for the armature-connections between the tops of the commutator necks and the armature-windings.

The accompanying drawing consists of a single figure which shows a vertical sectional view through a portion of a dynamo-electric machine embodying my novel commutator-centering means in a preferred form of embodiment.

I have shown my invention as being applied to a 3600-R. P. M. turbo-generator exciter, comprising a stator member 1, and a rotor member which includes armature-windings 2, a commutator-member 3, and a shaft 6. The portion of the shaft over which the commutator lies is illustrated as being provided with a steel bush 7 having a rear-end centering-plate 8, as well as a front-end centering-plate 9 connected thereto, as by being shrunk in place. The commutator-member 3 consists of a plurality of insulated conducting segments 11, each having a commutator neck 12 extending upwardly therefrom, at a point removed from the rear end of the commutator-member, and the tops of the commutator necks are electrically connected to the front coil extensions of the armature-windings by means of electrical connections 13.

The commutator-member is provided with a suitable number of insulated shrink-rings 14, 15, 16, 17 and 18, said shrink-rings being insulated from the commutator segments by mica or other insulating bushings 19. One of these shrink-rings, that numbered 18, is disposed around the front end of the commutator-member, as heretofore.

In accordance with my invention, one of the shrink-rings, that numbered 14, is placed around the rear end of the commutator-member, behind the commutator-necks 12; and furthermore, in accordance with my invention, the inner periphery of the commutator-member does not bind against the shaft or the bushings surrounding the shaft, as heretofore, but the inner periphery of the commutator-member is unsupported by, and spaced from, the shaft, as clearly indicated in the drawing. As a matter of extra precaution, a mica or other insulating bush 21 is desirably placed around the steel bush 7 which surrounds the shaft 6 underneath the commutator-member, but the inner periphery or bore of the commutator-member 3 is at all points spaced from this mica bush 21.

The centering-plates 8 and 9 are provided with overhanging cylindrical shoulder-members 22 and 23, which respectively engage the rear and front shrink-rings 14 and 18, the engagement preferably including an interlocking connection 24 which positively locks the commutator against axial or longitudinal displacement. Preferably, as shown, the overhanging cylindrical shoulder-members 22 and 23 are sufficiently thin to have a certain amount of flexibility or resilience, sufficient to admit of the small amount of radial expansion and contraction which occurs in the commutator-member and shrink-rings as a result of thermal expansions and contractions and centrifugal sources.

The rear-end centering-plate 8, which I have added, in accordance with my present invention, also serves as a supporting-means for the electrical connections 13 for the front coils of the armature-windings, which connections may be drawn down against an insulating covering 26 by means of banding-wires 27. If desired, also banding-wires 28 and 39 may be insulatingly applied to the outer peripheries of the commutator-necks 12 and the outer periphery of one or both of the overchanging cylindrical shoulder-members 22.

The rear centering-plate 8 may be of massive construction so that it is not flexible in a longitudinal direction, while the front centering-plate 9, as shown in the Penney patent, may be of a sufficiently restricted cross-sectional area so that it will bend the small amount necessary to accommodate longitudinal expansions and contractions of the commutator.

The centering-plates 8 and 9 may be conveniently applied, by being shrunk into place around the steel bush 7, and around the shrink-rings 14 and 18 respectively, or either centering-plate, 8 or 9, with its shrink-ring, 14 or 18, may be shrunk on, together, in a single operation, in which case the centering plate and its shrink-ring might be integral.

As previously noted, it is quite essential that structures of the type in question be not only accurately centered, and be stable as to their mountings and centerings, but also that they be very carefully and accurately balanced. The front centering-plate serves conveniently as a balancing-ring, as indicated by the balancing hole 31 indicated therein; and the rear portion of the commutator may be conveniently balanced by means of a rear balancing-ring 32 which surrounds the shrink-ring 15 which is in front of the commutator-necks 12, in a manner which is described and claimed in my Patent No. 2,249,834, granted July 22, 1941.

From the foregoing description, it will be understood that I have provided a means for assuring positive centering of the rear end of the commutator-member at all times, and a means in which the centering-fit tightens when the speed increases and also when the temperature increases, as any expansion of the copper of the commutator-bars or the mica of the insulation or the steel of the shrink-rings will obviously result in a firmer connection between the shrink-rings and the commutator, and between the front and rear shrink-rings and the abutment-shoulder of the front and rear centering plates. This is in marked contrast to previous centering designs, in which the effects of speed and heat operated in the direction toward loosening the centering-fit, rather than tightening the same. Because of the accurate centering which is secured by my invention, valuable time is saved in the balancing operation, and the scrap is reduced. My novel centering means also makes possible a more accurate calculation of the actual commutator stresses, since my commutator bars 11 are not partially "drum bound," as in the previous designs in which the rear end of the commutator was drawn down tightly against the shaft-bush.

I claim as my invention:

1. A high-speed dynamo-electric machine having a stator-member and a rotor-member, said rotor-member having armature-windings, a shaft, a commutator-member, and a shrink-ring commutator-centering plate carried by the shaft at each end of the commutator-member, said commutator-member comprising a plurality of insulated conducting segments each having a commutator-neck extending upwardly therefrom at a point removed from the rear end of the commutator-member, electrical connections between said commutator-necks and the armature-windings, said electrical connections being disposed above, and insulated from, the rear centering-plate, each of said shrink-ring commutator-centering plates having associated therewith a shrink-ring portion surrounding the adjacent end of the commutator-segments.

2. The invention as defined in claim 1, characterized by the inner periphery of the commutator-member being spaced from the shaft.

3. The invention as defined in claim 1, characterized by the overhanging shoulder-members of the centering-plates having sufficient resilience to admit of radial expansions and contractions of the commutator-member and front and rear shrink-rings.

4. A commutator member, and means for centering the same with respect to a shaft, said commutator-member comprising a plurality of insulated conducting segments each having a commutator-neck extending upwardly therefrom at a point removed from the rear end of the commutator-member, and a shrink-ring commutator-centering plate carried by the shaft at each end of the commutator-member, each of said shrink-ring commutator-centering plates having associated therewith a shrink-ring portion surrounding the adjacent end of the commutator-segments.

5. The invention as defined in claim 4, characterized by the inner periphery of the commutator-member being spaced from the shaft.

6. The invention as defined in claim 4, characterized by the overhanging shoulder-members of the centering-plates having sufficient resilience to admit of radial expansions and contractions of the commutator-member and front and rear shrink-rings.

7. A high-speed dynamo-electric machine having a stator-member and a rotor-member, said rotor-member having armature windings, a shaft, a commutator-member, and a commutator-centering plate carried by the shaft at each end of the commutator-member, said commutator-member comprising a plurality of insulated conducting segments each having a commutator-neck extending upwardly therefrom at a point removed from the rear end of the commutator-member, electrical connections between said commutator-necks and the armature-windings, said electrical connections being disposed above, and insulated from, the rear centering-plate, a plurality of insulated shrink-rings for said commutator-member, including shrink-rings respectively surrounding the front ends and the rear ends of said commutator-segments, and the front and rear centering-plates having overhanging cylindrical shoulder-members tightly engaging the outer peripheries of said front and rear shrink-rings, respectively.

8. The invention as defined in claim 7, characterized by the inner periphery of the commutator-member being spaced from the shaft.

9. The invention as defined in claim 7, characterized by the overhanging shoulder-members of the centering-plates having sufficient resilience to admit of radial expansions and contractions of the commutator-member and front and rear shrink-rings.

10. A commutator member, and means for centering the same with respect to a shaft, said commutator-member comprising a plurality of insulated conducting segments each having a commutator-neck extending upwardly therefrom at a point removed from the rear end of the commutator-member, a commutator-centering plate carried by the shaft at each end of the commutator-member, and a plurality of insulated shrink-rings for said commutator-member, including shrink-rings respectively surrounding the front ends and the rear ends of said commutator-segments, and the front and rear centering-plates having overhanging cylindrical shoulder-members tightly engaging the outer peripheries of said front and rear shrink-rings, respectively.

11. The invention as defined in claim 10, characterized by the inner periphery of the commutator-member being spaced from the shaft.

12. The invention as defined in claim 10, characterized by the overhanging shoulder-members of the centering-plates having sufficient resilience to admit of radial expansions and contractions of the commutator-member and front and rear shrink-rings.

EDWARD J. KREH, Jr.